United States Patent [19]
Yoshizawa et al.

[11] Patent Number: 5,186,995
[45] Date of Patent: Feb. 16, 1993

[54] OPTICAL DISK

[75] Inventors: Atsushi Yoshizawa; Fumio Matsui, both of Saitama, Japan

[73] Assignee: Pioneer Electronic Corporation, Tokyo, Japan

[21] Appl. No.: 496,972

[22] Filed: Mar. 23, 1990

[30] Foreign Application Priority Data

Jul. 6, 1989 [JP] Japan .................. 1-175155

[51] Int. Cl.$^5$ .............................. B32B 3/02
[52] U.S. Cl. ....................... 428/64; 428/65; 428/204; 428/206; 428/913; 369/288; 346/76 L; 430/945; 427/162
[58] Field of Search ............. 428/64, 65, 204, 206, 428/913; 369/272, 284, 288; 346/76 L, 135.1; 430/945; 427/162

[56] References Cited

U.S. PATENT DOCUMENTS 4,719,615  1/1988  Feyrer et al. .............. 369/284

FOREIGN PATENT DOCUMENTS 42659  2/1990  Japan .

Primary Examiner—Thomas J. Herbert, Jr.
Assistant Examiner—R. Follett
Attorney, Agent, or Firm—Foley & Lardner

[57] ABSTRACT

Disclosed herein is an optical disk comprising an elastomer layer formed on a transparent substrate and having infinitesimal bumps and depressions such as pre-addresses or pre-grooves, and a reflection retention layer which is formed on the elastomer layer and which comprises a thiophene vinylene resin having a glass transition temperature and, after curing, a high reflection factor. The reflection retention layer having high levels of affinity with polymers minimizes the possibility of its delamination from the elastomer layer. This makes it easier to form the reflection retention layer.

20 Claims, 5 Drawing Sheets

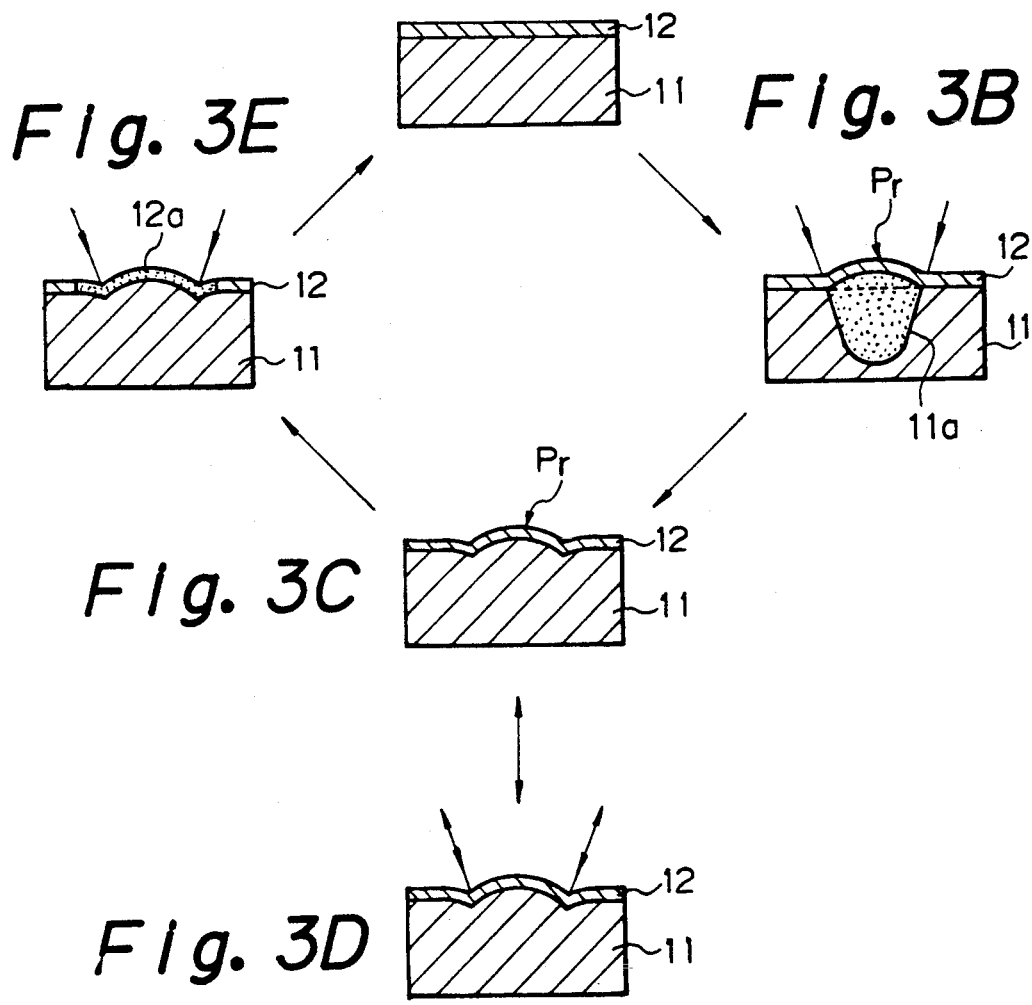

Fig. 5A
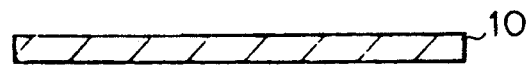
Fig. 5B
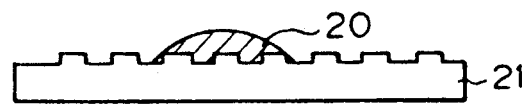
Fig. 5C
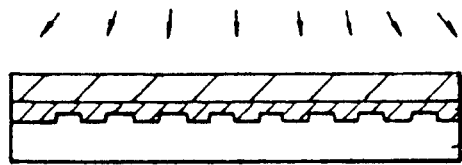
Fig. 5E
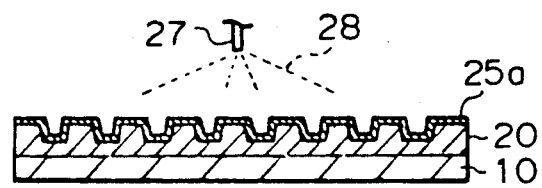
Fig. 5D
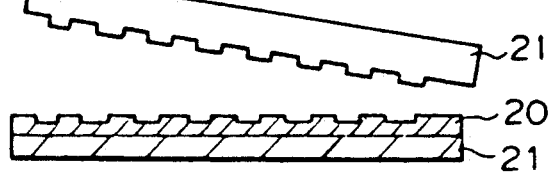
Fig. 5F
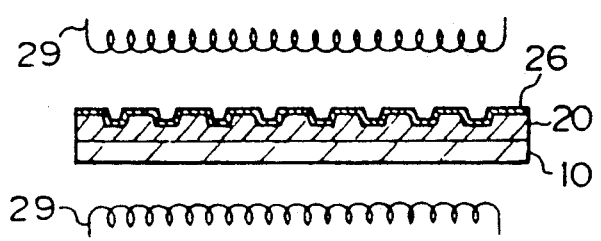
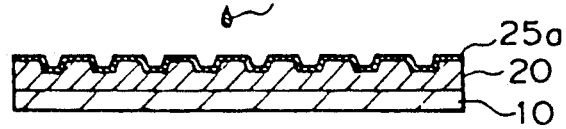
Fig. 5G
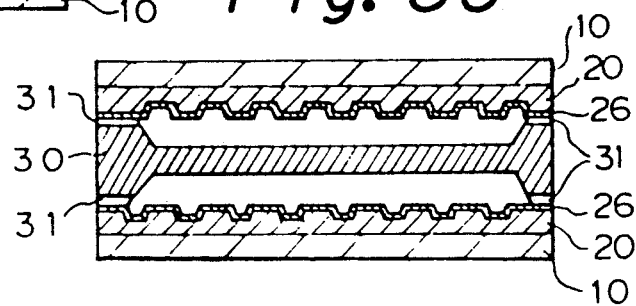

OPTICAL DISK

BACKGROUND OF THE INVENTION

1. Field of the Invention

The present invention relates to an erasable optical data storage disk to and from which to write, erase and read data.

2. Description of the Prior Art

There have existed morphologically erasable optical disks which utilize an elastomer layer containing organic pigments for data storage, erasure and retrieval. One such optical disk is disclosed in U.S. Pat. No. 4,719,615. This disk, as illustrated in FIG. 1, comprises an elastomer layer 11 on a substrate 10, and a retention layer 12 formed on top of the layer 11 and having a glass transition temperature. On the retention layer 12 is a gap 13 which is topped by a transparent protective substrate 15. Another erasable optical disk of a similar type, as depicted in FIG. 2, has the substrate 10 on which is the elastomer layer 11 which is topped by the retention layer 12 having the glass transition temperature. On top of the retention layer 12 is the transparent protective substrate 15 having pre-grooves or pre-addresses P with a compression layer 14 therebetween. The pre-grooves or pre-addresses are infinitesimal bumps and depressions which are called pits. With this optical disk, the retention layer 12 comprises an epoxy resin containing a red orange pigment. The elastomer layer 11 has a silicon rubber containing a carbon black pigment.

The recording medium that uses these organic pigments utilizes a mechanical deformation of the elastomer layer 11 and the retention layer 12 for data storage, the deformation being a morphological change of the layers due to a temperature change. This recording medium produces pits by having different pigments in different layers absorb laser beams of different wavelengths for selective heating of the material.

In operation, the optical disk works as follows. For writing data, as shown in FIG. 3A, a laser beam of a long wavelength is applied to the retention layer 12, the laser beam being absorbable only by the expandable elastomer layer 11. The beam thermally expands the elastomer layer 11 in the form of a spot. The partially expanded elastomer layer 11a partially raises the retention layer 12, as shown in FIG. 3B. As a result, the retention layer 12 forms a viscoelastically stable projection Pr, as depicted in FIG. 3C.

For reading data, as illustrated in FIG. 3D, a write laser beam is focused onto the target projection Pr. The resulting diffusion of the light by the projection Pr on the deformed retention layer 12 is detected by suitable means as a unit of data.

For data erasure, as depicted in FIG. 3E, a laser beam of a short wavelength is applied to the retention layer 12, the laser beam being absorbable by the layer 12 alone. The heating caused by the laser beam reduces the viscoelasticity coefficient of a projection vicinity layer 12a of the retention layer 12. This causes the expanded elastomer layer 11 to lower the projection Pr on the retention layer 12. Thus the original flat, smooth surface is restored on the optical disk.

One problem with this type of optical disk is that because the reflection factor of the retention layer 12 is low, the projection Pr formed thereon is difficult to recognize. It is thus difficult to recognize pre-grooves or pre-addresses on the protective substrate 15. To bypass this problem, a reflective film has been provided on the disk, which has complicated the disk construction.

SUMMARY OF THE INVENTION

It is therefore a primary object of the present invention to provide a novel optical data storage disk which eliminates the above and other technical problems, and which has a simple construction suitable for mass production in simplified manufacturing setups.

The optical data storage disk according to the present invention comprises a transparent substrate, an elastomer layer which is formed on top of the substrate and which has pre-address pits or pre-grooves provided circumferentially thereon, and a polymer of a high reflection factor which is formed on top of the elastomer layer and which has a glass transition temperature.

BRIEF DESCRIPTION OF THE DRAWINGS

FIG. 3 is a partial sectional view of how the prior art optical data storage disk works;

FIG. 5 is a sectional partially schematic representation of how the optical data storage disk according to the present invention is manufactured;

DETAILED DESCRIPTION OF A PREFERRED EMBODIMENT

A preferred embodiment of the present invention will now be described by referring to the accompanying drawings.

Figure 1:
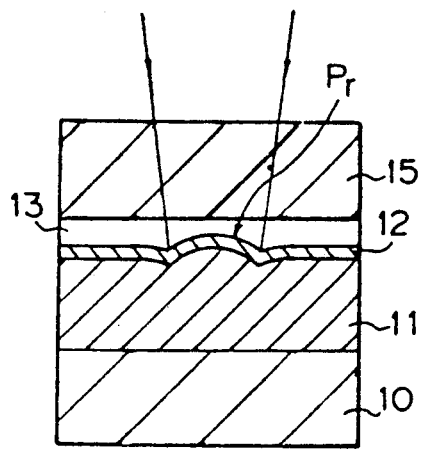
FIGS. 1 and 2 are partial sectional views of a prior art optical data storage disk.
Figure 2:
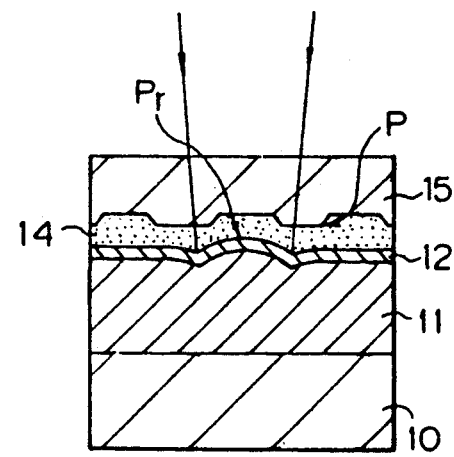
Figure 4:
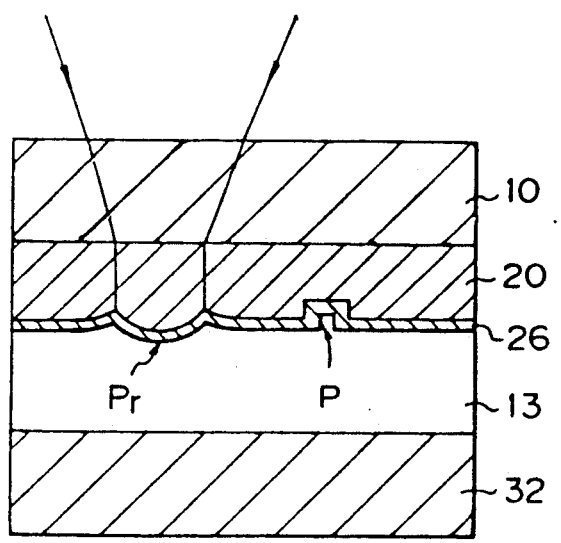
FIG. 4 is a partial sectional view of the optical data storage disk according to the present invention.

FIG. 4 is a partial sectional view of the optical data storage disk illustratively embodying the present invention. As depicted, the disk comprises a transparent substrate 10, an elastomer layer 20 and a reflection retention layer 26 laminated from bottom to top, the layer 26 being deposited on a protective board 32 with a gap 13 provided therebetween. The elastomer layer 20 has pits such as pre-grooves or pre-addresses P. The retention layer 26 contains a thiophene vinylene resin which has a glass transition temperature and which acquires a high reflection factor after curing.

The transparent substrate 10 contains such transparent plastic materials as PMMA and PC. The elastomer layer 20 has for its major ingredient a polymer such as an ultraviolet cured type resin, and contains such pigments as a benzene thiol nickel complex, a cyanine dye, a phthalocyanine and a naphthalocyanine whose properties permit absorption of a laser beam with a wavelength of 830 nm for writing data. The reflection retention layer 26 comprises a PTV (2, 5-thiophene vinylene) that contains pigments whose properties permit absorption of a laser beam with a wavelength of 780 nm for erasing data.

As illustrated in FIG. 5, the optical data storage disk according to the present invention is manufactured as follows:

Referring to FIG. 5A, a stamper 21 is mounted on a transfer device, not shown. A coat of an ultraviolet cured type elastomer layer 20 is applied onto the pit surface of the stamper 21. A previously prepared substrate 10 is pressed onto the ultraviolet cured type elastomer layer 20 just applied so as to stick the layer firmly to the stamper 21.

Then as shown in FIG. 5B, ultraviolet rays are irradiated from the side of the substrate 10 to cure the elastomer layer 20.

As depicted in FIG. 5C, the substrate 10 together with the cured elastomer layer 20 is delaminated from the stamper 21. This leaves the elastomer layer 20 as a transfer layer having pits thereon. In this embodiment, the ultraviolet cured type elastomer is used to constitute the elastomer layer 20. Alternatively, the layer 20 can be of a thermosetting elastomer.

Meanwhile, there is needed a precursor polymer for the PTV that will make up the reflection retention layer 26 on top of the ultraviolet cured type elastomer layer 20. To produce the precursor, it is necessary to prepare as a starting material a sulfonium salt (2, 5-dimethyl thiophene) whose molecular structure is expressed by formula (I) below.

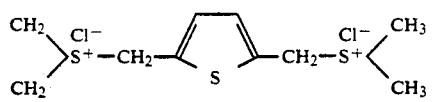

(I)

This starting material is polymerized in water/methanol ($H_2O/CH_3OH$) at a low temperature ($-30°$ C.). During polymerization, an intermediate whose molecular structure is given by formula (II) below occurs. With the methanol component reacting to the principal chain, $(CH_3)_2S-$ as the sulfonium salt is eliminated and substituted. With the ether component becoming a side chain, the intermediate turns into a precursor polymer whose molecular structure is expressed by formula (III) below.

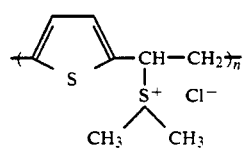

(II)

(n = integer)

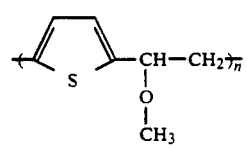

(III)

(n = integer)

The precursor polymer thus obtained is soluble in an organic solvent. Thus the polymer is solved in one such solvent to prepare a precursor polymer solution.

As shown in FIG. 5D, a thin film forming process is then performed. A "spin coating" technique is used to have the precursor polymer solution 25 applied through a nozzle 24 onto the pit transfer surface of the substrate 10 which rotates on a turntable, not shown, and which bears the ultraviolet cured type elastomer layer 20 thereon. In this manner, a precursor polymer film 25a whose molecular structure is given by formula (III) above is formed on the elastomer layer 20.

Then as illustrated in FIG. 5E, a reflective resin layer forming process is carried out. A treatment agent such as hydrochloric acid is uniformly sprayed or dripped from a nozzle 27 onto the precursor polymer film 25a on which the pits were transferred with the stamper.

After that, as shown in FIG. 5F, the substrate 10 bearing the precursor polymer film 25a thereon is heated by a heater 29. The heating polymerizes and cures the precursor polymer film 25a, producing on top the ultraviolet cured type elastomer layer 20 the PTV reflection retention layer 26, whose molecular structure is given by formula (IV) below.

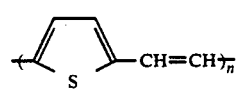

(IV)

(n = integer)

Two substrates thus manufactured are positioned opposite to each other, with their reflection retention layers 26 facing each other. An internal space is retained by use of a reinforcing spacer plate 30, the layers 26 being bonded together to sandwich the plate 30 with bonding agent layers 31 positioned therebetween. When the bonding is cured, as illustrated in FIG. 5G, there is obtained a two-sided type optical data storage disk comprising the substrate 10 and the reflection retention layer 26 which contains the PTV cured resin having a high reflection factor and which bears the pits thereon.

In this manner, the PTV can provide a uniform thin film through the synthetic process involving the soluble precursor polymer as an intermediate. As the precursor turns from polymer to PTV, the optical properties of the material change significantly. That is, when cured, the PTV acquires a high reflection factor.

To check the PTV for its high reflection factor, we obtained PTV film samples with a thickness of about 500 Å. The samples were prepared by the same process as the manufacturing. That is, the precursor polymer was heated at 260° C. for one hour in a vacuum for chemical change from polymer to PTV.

Figure 6:
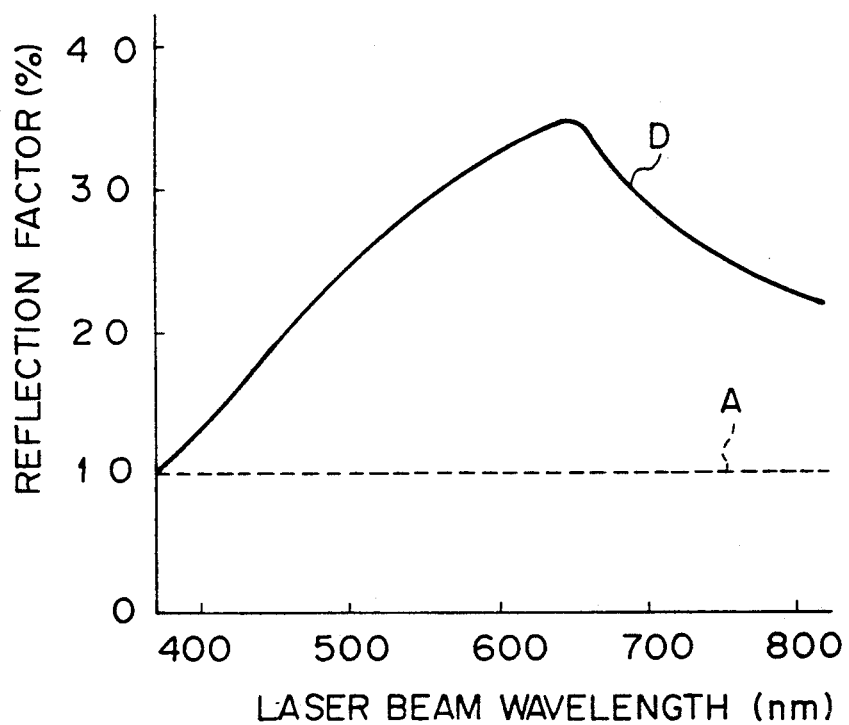
FIG. 6 is a graphic representation of how the reflection factor of a precursor polymer film varies as the film changes from the precursor polymer to a PTV under heat according to the present invention.

FIG. 6 graphically illustrates how the precursor polymer film before heating (A) and the PTV film after heating (D) changed their optical properties. While the reflection factor of the unheated film (A) was about 10%, the heated film (D) showed its reflection factor to be significantly higher in all visible region. In particular, the reflection factor reached 35% at about 640 nm.

FIG. 7 depicts how the optical data storage disk according to the present invention works. For writing data, as shown in FIG. 7A, a laser beam with a long wavelength of, say, 830 nm is applied onto the reflection retention layer 26, the laser beam being absorbable only by the expandable ultraviolet cured type elastomer layer 20. The beam thermally expands a spot on the elastomer layer 20. The spot-shaped expansion causes the partially expanded ultraviolet cured type elastomer layer 20a to partially raise the reflection retention layer 26, as shown in FIG. 7B. As a result, the reflection retention layer 26 forms a viscoelastically stable projection Pr, as illustrated in FIG. 7C.

Figure 7A:
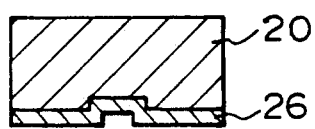
FIG. 7 is a partial sectional view of how the optical data storage disk according to the present invention works.
Figures 7B, 7E:
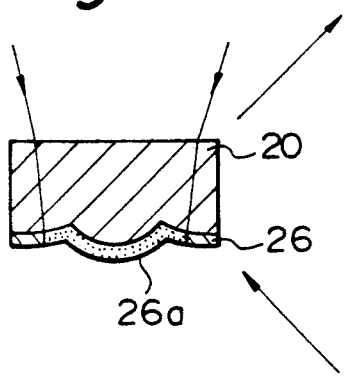
Figure 7C:
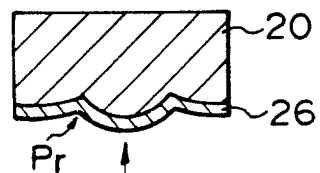
Figure 7D:
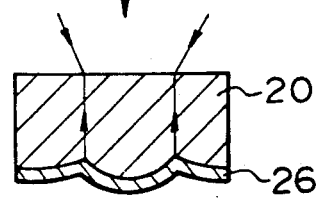

For reading data, a write laser beam is focused onto the target projection Pr on the deformed reflection retention layer 26, as depicted in FIG. 7D. The resulting scattering of the light is detected to recognize the projection and hence the data it represents.

For erasing data, as shown in FIG. 7E, a laser beam with a short wavelength of, say, 780 nm is applied onto the reflection retention layer 26, the laser beam being absorbable only by the retention layer 26. The laser beam heats the reflection retention layer 26 alone and thereby lowers the viscoelasticity coefficient of a projection vicinity area 26a. This causes the expanded elastomer layer 20 to lower the projection Pr on the reflection retention layer 26, restoring the original smooth surface.

As indicated, the optical data storage disk according to the present invention comprises an elastomer layer and a reflection retention layer. The elastomer layer is formed on a transparent substrate and has infinitesimal bumps and depressions thereon. The reflection retention layer is a polymer retention layer made up of a thiophene vinylene resin, and is characterized by a glass transition temperature and a high reflection factor. The disk construction is conductive to easy recognition of pre-grooves or pre-addresses on the surface. Since the simplified construction has no metal reflective film and is thus suitable for mass production in simple manufacturing setups, significant improvements in disk productivity are available.

According to the present invention, the reflection retention layer formed with a cured resin having a high reflection factor affords the optical disk more stability during exposure to oxygen and moisture and thus more life. Because the organic reflection retention layer has high levels of affinity with such plastics as PMMA and PC, there is little possibility of the layer getting delaminated from the elastomer layer. In addition, the organic reflection retention layer is conducive to being formed into films by the so-called coating or spin coating technique. The enhanced workability of the retention layer further promotes mass production of the optical disk.

What is claimed is:

1. An erasable optical disk comprising:
    a transparent substrate;
    an elastomer layer comprising a first pigment capable of absorbing a first laser beam for writing data and formed on said substrate; and
    a reflective retention layer comprising a thiophene vinylene resin and containing a second pigment capable of absorbing a second laser beam for erasing data whose wavelength is different from that of said first laser beam and formed on said elastomer layer.

2. The optical disk according to claim 1, wherein said thiophene vinylene resin is a (2,5-thiophene vinylene resin.

3. The optical disk according to claim 1, wherein said elastomer layer comprises an ultraviolet cured elastomer.

4. The optical disk according to claim 2, wherein said elastomer layer comprises an ultraviolet cured elastomer.

5. An optical disk according to claim 1, wherein said elastomer layer has pre-address pits and pre-grooves constructed circumferentially thereon.

6. An optical disk according to claim 1, wherein said transparent substrate comprises polymethyl methacrylate or polycarbonate.

7. An optical disk according to claim 1, wherein said first pigment is selected from the group consisting of a benzene thiol nickel complex, a cyanine dye, a phthalocyanine, and a naphthalocyanine.

8. An optical disk according to claim 7, wherein said first laser beam has a wavelength of 830 nm.

9. An optical disk according to claim 8, wherein said second laser beam has a wavelength of 780 nm.

10. An optical disk according to claim 1, which consists essentially of said transparent substrate, said elastomer layer, and said reflective retention layer.

11. An optical disk according to claim 1, wherein said polymer retention layer consists essentially of said thiophene vinylene resin and said second pigment.

12. An optical disk according to claim 1, wherein said elastomer layer comprises a thermosetting elastomer.

13. An optical disk according to claim 1, which comprises no metal reflective film.

14. An optical disk according to claim 1, wherein said thiophene vinylene resins has a glass transition temperature less than the temperature increase due to irradiation with said first laser beam, and wherein said thiophene vinylene resin has a reflection factor of 10% or more.

15. A two-sided optical disk comprising two optical disks as claimed in claim 1, positioned opposite to each other with their retention layers facing each other, a spacer plate inserted between said optical disks, and wherein the retention layers of each disk are bonded to the plates with bonding agent.

16. An optical disk according to claim 1, wherein said first laser beam has a longer wavelength then said second laser beam, wherein said first pigment does not absorb said second laser beam and said second pigment does not absorb said first laser beam.

17. An optical disk according to claim 14, wherein said reflection factor is between 10 and 35%.

18. A process for preparing an optical disk according to claim 1, which comprises the steps of
    a) applying said elastomer layer comprising an ultraviolet curable elastomer to the pit surface of a stamper,
    b) pressing said transparent substrate onto said ultraviolet curable elastomer,
    c) irradiating said elastomer layer with ultraviolet rays so as to cure said ultraviolet curable elastomer,
    d) removing said stamper from said elastomer layer,
    e) coating a layer comprising a precursor for said thiophene vinylene resin onto said elastomer layer,
    f) treating said layer comprising said precursor to render it reflective, and
    g) heating said precursor so as to polymerize and cure said precursor, thus forming said retention layer.

19. A process according to claim 18, wherein said step e) comprises spin coating a solution of said precursor polymer onto said elastomer layer, and step f) comprises spraying or dripping hydrochloric acid onto said precursor.

20. A process according to claim 18, which additionally comprises
    h) positioning two optical disks prepared according to steps a) through g) opposite to each other with their retention layers facing each other, inserting a spacer plate between said optical disks, and bonding the retention layers to the plates with bonding agent, so as to obtain a two-sided optical disk.

* * * * *